(12) United States Patent
Livingston et al.

(10) Patent No.: US 12,411,690 B2
(45) Date of Patent: Sep. 9, 2025

(54) DYNAMICALLY CONFIGURABLE FIRMWARE REGISTER MAP INTERFACE FOR AN EMBEDDED SOFTWARE SYSTEM

(71) Applicant: Cirrus Logic International Semiconductor Ltd., Edinburgh (GB)

(72) Inventors: Jeffrey B. Livingston, Austin, TX (US); Nariankadu D. Hemkumar, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 184 days.

(21) Appl. No.: 18/295,698

(22) Filed: Apr. 4, 2023

(65) Prior Publication Data
US 2024/0338217 A1    Oct. 10, 2024

(51) Int. Cl.
  *G06F 8/654* (2018.01)
  *G06F 8/65* (2018.01)
  *G06F 9/30* (2018.01)

(52) U.S. Cl.
  CPC ............ *G06F 9/3013* (2013.01); *G06F 8/654* (2018.02); *G06F 8/66* (2013.01); *G06F 9/30192* (2013.01)

(58) Field of Classification Search
  CPC .......... G06F 9/3013; G06F 8/654; G06F 8/66; G06F 9/30192
  See application file for complete search history.

(56) References Cited

U.S. PATENT DOCUMENTS

| | | | | |
|---|---|---|---|---|
| 6,195,746 B1 * | 2/2001 | Nair | ..................... | G06F 9/30094 |
| | | | | 712/210 |
| 2002/0170050 A1 * | 11/2002 | Fiorella, III | ............ | G06F 8/656 |
| | | | | 717/168 |
| 2017/0147321 A1 * | 5/2017 | Marr, Jr. | .................. | G06F 8/654 |
| 2018/0239604 A1 * | 8/2018 | Cain, III | ............. | G06F 9/30138 |
| 2022/0138313 A1 * | 5/2022 | Pizlo | .................... | G06F 9/30054 |
| | | | | 726/23 |
| 2022/0366008 A1 * | 11/2022 | Shin | ........................ | G06F 9/541 |
| 2023/0089349 A1 * | 3/2023 | Sohi | ..................... | G06F 9/30043 |
| | | | | 712/225 |

* cited by examiner

*Primary Examiner* — Wei Y Zhen
*Assistant Examiner* — Brahim Bourzik
(74) *Attorney, Agent, or Firm* — Jackson Walker L.L.P.

(57) ABSTRACT

A method for dynamic configuration of a register map in an embedded software system may include, in response to receipt of configuration parameters for the register map, generating at least one table of metadata descriptors associated with objects of the register map based on the configuration parameters and embodied in random access memory of the embedded software system, the metadata descriptors defining composition and order of registers of the register map and configured to interface with a register map interpreter in firmware stored in read-only memory of the embedded software system.

28 Claims, 2 Drawing Sheets

DYNAMICALLY CONFIGURABLE FIRMWARE REGISTER MAP INTERFACE FOR AN EMBEDDED SOFTWARE SYSTEM

FIELD OF DISCLOSURE

The instant disclosure relates generally to processing systems, and more specifically, to systems and methods for enabling a dynamically configurable register map interface for an embedded software system.

BACKGROUND

Processing systems are ubiquitous in both computing systems and embedded applications in consumer and industrial devices. The primary host control interface for firmware executing on an embedded system is a set of software registers, also known as a "register map," which may include bit fields that are set by the host to configure the firmware, and by the firmware to communicate system status back to the host.

Currently available tools and design methods only allow system designers to specify statically defined register maps which are fixed at compile time, and not reconfigurable once deployed. Thus, changes to statically-defined register maps may require software patching or wholesale replacement with a recompiled software image after necessary code revisions are applied. Such recompilation of the software may be costly and time consuming, and may require careful refactoring to fit patched code into remaining fragmented memory resources on an embedded system.

SUMMARY

In accordance with the teachings of the present disclosure, certain disadvantages and problems associated with configuring a register map for an embedded software system may be reduced or eliminated.

In accordance with embodiments of the present disclosure, a method for dynamic configuration of a register map in an embedded software system may be disclosed. The method comprising, in response to receipt of configuration parameters for the register map, generating at least one table of metadata descriptors associated with objects of the register map based on the configuration parameters and embodied in random access memory of the embedded software system, the metadata descriptors defining composition and order of registers of the register map and configured to interface with a register map interpreter in firmware stored in read-only memory of the embedded software system.

In accordance with these and other embodiments of the present disclosure, a system for dynamic configuration of a register map in an embedded software system may be disclosed. The system may include a configuration tool configured to communicatively couple to a processor and configured to, in response to receipt of configuration parameters for the register map, generate at least one table of metadata descriptors associated with objects of the register map based on the configuration parameters and embodied in random access memory of the embedded software system, the metadata descriptors defining composition and order of registers of the register map and configured to interface with a register map interpreter in firmware stored in read-only memory of the embedded software system.

In accordance with these and other embodiments of the present disclosure, a method of using a dynamically configured register map in an embedded software system may include dynamically defining a memory architecture interface based on at least one table of metadata descriptors associated with objects of a register map, wherein the at least one table of metadata descriptors is based on configuration parameters and embodied in random access memory of the embedded software system, wherein the metadata descriptors define composition and order of registers of the register map and configured to interface with a register map interpreter in firmware stored in read-only memory of the embedded software system.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

In accordance with embodiments of this disclosure, systems and methods disclosed herein may apply a series of dependent software patches to efficiently modify software in an environment with limited or permanent storage. These systems and methods may consider existing patches present on a device as its lineage and create a child patch in an accretive manner that utilizes prior patches as much as possible to minimize size of the child patch. Such an approach may provide multiple paths to the same end functionality. Each patch may be developed to reuse existing patch functionality and only extend functionality as required to deliver a desired feature set.

A difference in lineage may exist among devices because devices are often programmed with the current software state when they are manufactured. Over time, many devices may be manufactured with different starting software states and intermediate software updates.

Figure 1:
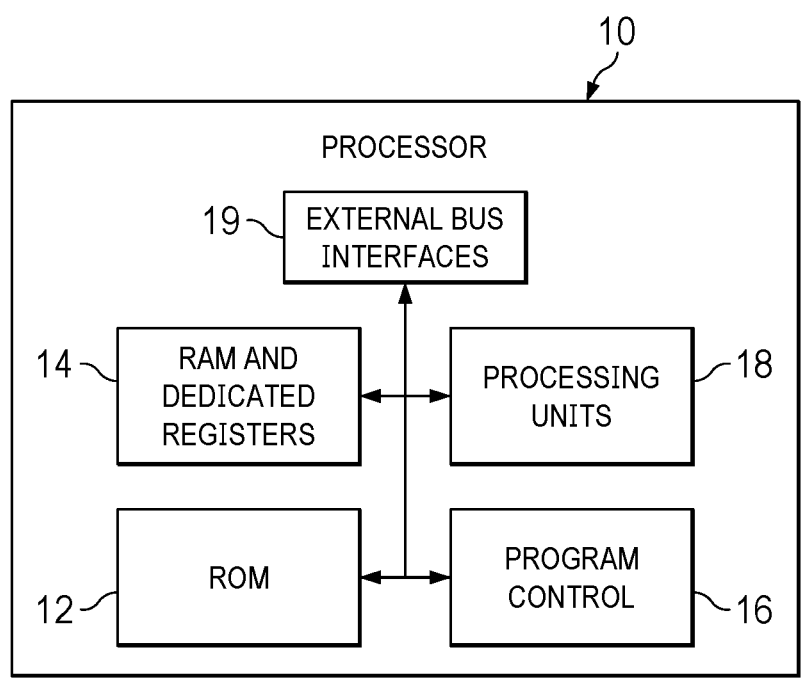
FIG. 1 illustrates a block diagram of selected components of an example processing system, in accordance with embodiments of the present disclosure.

FIG. 1 illustrates a block diagram of selected components of an example processing system comprising processor 10, in accordance with embodiments of the present disclosure. Processor 10 may be of the form of a microprocessor or microcontroller suitable for use in embedded applications, such as digital signal processing cores included in larger "system on a chip" type integrated circuits that include other input/output and signal processing functions. In particular, processor 10 may include a read-only memory (ROM) 12 and a random access memory (RAM)/register bank 14 coupled via an internal bus to processing units 18, a program control circuit 16, and external bus interfaces 19. Processor 10 is an exemplary device that embodies one or more of the techniques of the present disclosure. However, the techniques of the present disclosure may be used in any application with any type of processor that includes one or more of the improvements described herein.

Program control circuit 16 directs the execution of program instructions that cause processing units 18 to perform various tasks, such as floating-point and fixed-point operations, the loading of values to and from external bus interfaces 19, the loading and storing of program instructions and data to and from RAM 14, and the loading of program instructions from ROM 12. In particular, program control circuit 16 is responsible for the implementation of branching and looping instructions that are loaded from RAM 14 and ROM 12 when encountered in the sequence of execution of program code that is generally sequential in memory until a branch or looping instruction is encountered in the program instruction sequence.

In some embodiments, ROM 12 or portions thereof may be masked ROM or one-time programmable (OTP) memory. In such embodiments, ROM 12 or such portions thereof may store firmware.

Figure 2:
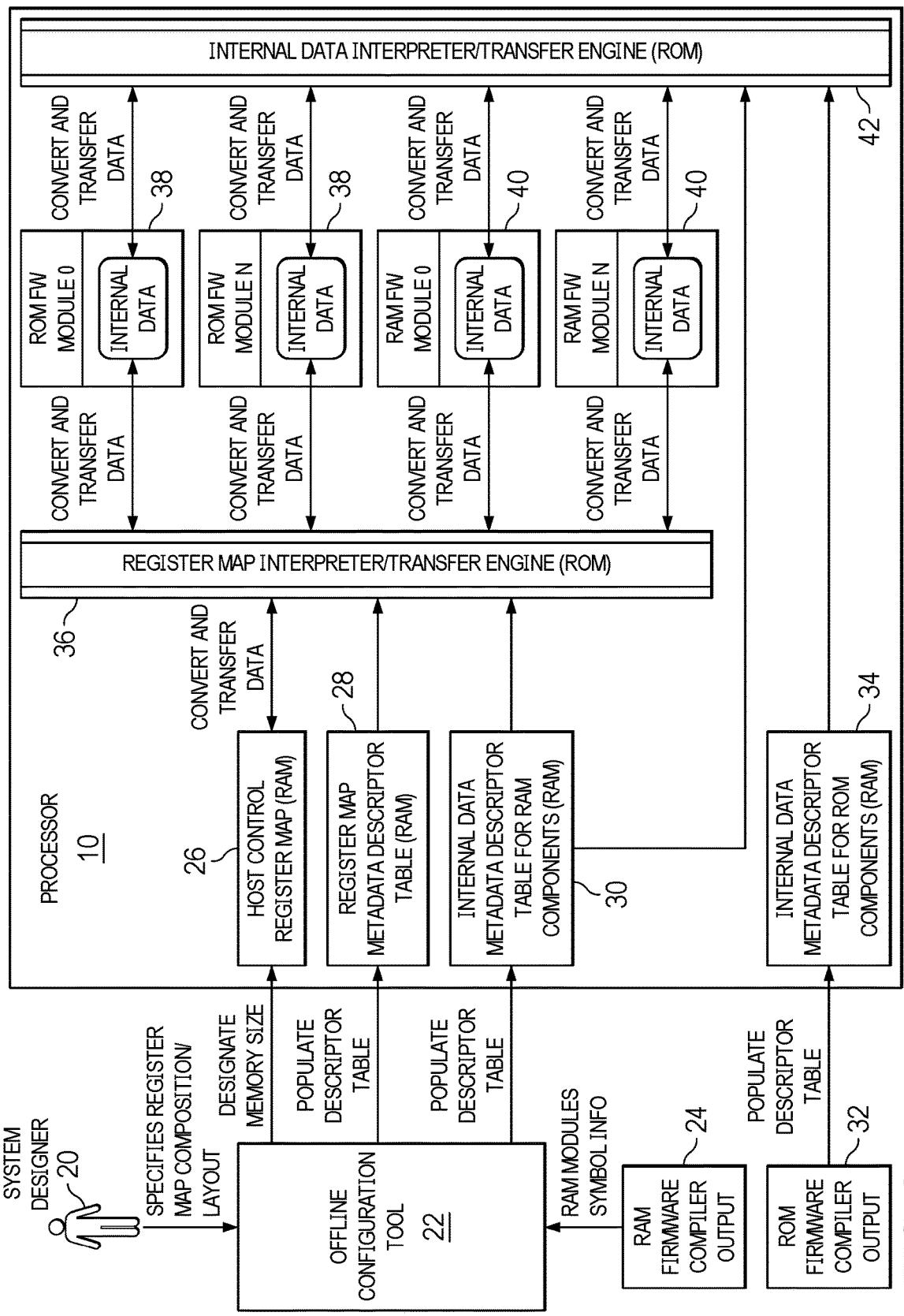
FIG. 2 illustrates a functional block diagram of a memory architecture interface, in accordance with embodiments of the present disclosure.

FIG. 2 illustrates a functional block diagram of a memory architecture interface, in accordance with embodiments of the present disclosure. As shown in FIG. 2, various portions of ROM 12 and RAM 14 may be configured and interfaced with one another to enable a dynamically configurable register map interface for an embedded software system executing on processor 10, which may allow a designer to modify a register map composition without having to modify the underlying firmware on the chip.

To illustrate, a system designer 20 may specify a register map composition and/or layout for the embedded software system using an offline configuration tool 22 that may interface with processor 10. In addition to receiving a register map composition and/or layout from system designer 20, offline configuration tool 22 may also receive symbol information from the output of a RAM firmware compiler 24. Based on information received from system designer 20, offline configuration tool 22 may specify the dynamic register map by a set of data structures comprising metadata descriptions of the composition and ordering of the registers. Such metadata for a register may include the number of bit fields, the description of the type, size and format of the discrete data object contained in each field, as well as the mapping of each object to a destination data object known to the firmware. For example, as shown in FIG. 2, offline configuration tool 22 may designate a memory size for a host control register map 26 embodied in RAM 14, and may populate a register map metadata descriptor table 28 embodied in RAM 14, and may populate an internal data metadata descriptor table for RAM components 30 embodied in RAM 14. A ROM firmware compiler 32 may populate an internal data metadata descriptor table for ROM components 34 embodied in RAM 14.

On the firmware side, a complimentary set of metadata descriptors may exist for destination data objects that may include the type, size, format and unique identifier for the objects of the register map. With both source and destination objects fully described and locatable via unique identifier, a register map interpreter module 36 embodied in firmware of ROM 12 may convert and route data between sources, including ROM firmware modules 38 embodied in ROM 12 and RAM firmware modules 40 embodied in RAM 14.

Because metadata descriptor tables 28, 30, and 34 are stored in reserved areas of RAM 14, it may be possible to dynamically reconfigure the register map by downloading a new set of metadata from offline configuration tool 22 into metadata descriptor tables 28 and 30. Accordingly, system designer 20 may use offline configuration tool 22 to specify a new register map layout, and have offline configuration tool 22 generate the corresponding metadata descriptor tables 28, 30, and 34.

To facilitate reconfiguration, offline software tools could be used to allow system designers to specify a new register map layout, and have the tool generate the corresponding metadata descriptor tables 28 and 30. Accordingly, system designer 20 may reconfigure register map 26 to change register names, order, field composition, format, and mappings to known data objects in existing ROM firmware without the need to modify firmware.

The memory architecture interface allows for custom RAM modules 40 to be introduced into an existing firmware framework. In order for a RAM module 40 to operate in the existing firmware framework, RAM module 40 may need a way to access data in the framework as well as a way for RAM module 40 to be called from necessary entry points in execution threads of processor 10. To support function calls, the firmware framework may need to support an entry point callback registry mechanism, which may allow a RAM module 40 to register functions with the framework for predefined entry points, and the framework may call these registered functions at the designated point.

The memory architecture interface may include internal data interpreter/transfer engine 42 embodied in ROM 12 that may allow RAM modules 40 to interface with data objects in existing firmware. Internal data interpreter/transfer engine 42 may operate in the same or a similar fashion as register map interpreter module 36—by using a metadata descriptor table that stores the data format and unique identifier information for routing between sources. Such internal data metadata descriptor table may be generated as part of the ROM firmware. Metadata descriptors may be generated for all internal data objects that the system designer may desire to expose to RAM modules 40.

In some embodiments, offline configuration tool 22 may generate the internal data metadata descriptor table for additional RAM modules 40 using the symbol location information generated by the compiler when the firmware is built. During runtime, RAM modules 40 may interface with the internal data interpreter module to mediate data access with system data objects exposed by the interface. Internal data interpreter/transfer engine 42 may perform the conversion and transferring of data between sources.

The systems and methods described herein may provide improvements to known types of dynamically configurable embedded software architecture. In known types of dynamically configurable embedded software architecture, the software structure may be built from predefined components that are instantiated according to a user-specified configuration, and an operating system framework assembles the software components, linkages between components, and interfaces, including the host interface components corresponding to dynamically configured elements, accordingly. Such type of architecture allows dynamic configuration of predefined building blocks, with predefined interfaces to each atomic block. On the other hand, the dynamically configurable register map of the present disclosure offers the ability to dynamically redefine the specifics of an interface itself, from the high-level layout of the interface elements (e.g., registers), down to the low-level data format of each distinct data element within the interface (e.g., individual bit fields within registers). It further allows introduction of previously-undefined custom random access memory (RAM) modules into an existing read-only memory (ROM) firmware framework.

The operations described above as performed by a processor may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general-purpose processor (e.g., CPU or DSP) capable of executing instructions contained in software. The firmware and/or software may include instructions that cause the processing of signals described herein to be performed. The circuitry or software may be organized as blocks that are configured to perform specific functions. Alternatively, some circuitry or software may be organized as shared blocks that may perform several of the described operations. In some embodiments, the IC that is the controller may include other functionality. For example, the controller IC may include an audio coder/decoder (CODEC) along with circuitry for performing the functions described herein. Such an IC is one example of an audio controller. Other audio functionality may be additionally or alternatively integrated with the IC circuitry described herein to form an audio controller.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that may be accessed by a computer. By way of example, and not limitation, such computer-readable media may comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that may be used to store desired program code in the form of instructions or data structures and that may be accessed by a computer. Disk and disc includes compact discs (CD), laser discs, optical discs, digital versatile discs (DVD), floppy disks, and Blu-ray discs. Generally, disks reproduce data magnetically, and discs reproduce data optically. Combinations of the above should also be included within the scope of computer-readable media.

In addition to storage on computer readable media, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, where general purpose processors are described as implementing certain processing steps, the general purpose processor may be a digital signal processor (DSP), a graphics processing unit (GPU), a central processing unit (CPU), or other configurable logic circuitry. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

What is claimed is:

1. A method for dynamic configuration of a register map in an embedded software system, the method comprising, in response to receipt of configuration parameters for the register map: generating at least one table of metadata descriptors associated with objects of the register map based on the configuration parameters and embodied in random access memory of the embedded software system, the metadata descriptors defining composition and order of registers of the register map and configured to interface with a register map interpreter in firmware stored in read-only memory of the embedded software system; and
   the register map interpreter modifies the register map composition without having to reprogram or recompile the firmware.

2. The method of claim 1, wherein the configuration parameters define one or more of a number of bit fields, a description of a type, a description of a size, and a format of a discrete data object of each field of the register map.

3. The method of claim 1, wherein the configuration parameters define a mapping of each object to a destination data object known to the firmware.

4. The method of claim 1, wherein the at least one table comprises: a register map metadata descriptor table embodied in the random access memory and configured to interface with the register map interpreter in firmware stored in read-only memory of the embedded software system; and an internal data metadata descriptor table embodied in the random access memory and configured to interface with the register map interpreter and with an internal data interpreter embodied in firmware stored in read-only memory of the embedded software system.

5. The method of claim 1, wherein the at least one table of metadata descriptors enables execution of a custom random access firmware module in concert with the firmware stored in read-only memory of the embedded software system.

6. The method of claim 1, further comprising dynamically defining a memory architecture interface based on the at least one table of metadata descriptors.

7. The method of claim 6, further comprising dynamically defining distinct data elements within the memory architecture interface based on the at least one table of metadata descriptors.

8. The method of claim 1, wherein the configuration tool is an offline software tool that allows a system designer to specify a new register map layout and generate the corresponding metadata descriptor tables.

9. The method of claim 1, wherein the configuration parameters define a mapping of each object to a destination data object known to the firmware.

10. The method of claim 1, wherein the at least one table of metadata descriptors comprises: a register map metadata descriptor table embodied in the random access memory and configured to interface with the register map interpreter in firmware stored in read-only memory of the embedded software system; and an internal data metadata descriptor table embodied in the random access memory and configured to interface with the register map interpreter and with an internal data interpreter embodied in firmware stored in read-only memory of the embedded software system.

11. The method of claim 1, wherein the at least one table of metadata descriptors enables execution of a custom random access firmware module in concert with the firmware stored in read-only memory of the embedded software system.

12. A system for dynamic configuration of a register map in an embedded software system, the system comprising: a configuration tool comprising a processor and configured to, in response to receipt of configuration parameters for the register map, generate at least one table of metadata descriptors associated with objects of the register map based on the configuration parameters and embodied in random access memory of the embedded software system, the metadata descriptors defining composition and order of registers of the register map and configured to interface with a register map interpreter in firmware stored in read-only memory of the embedded software system; and
    the register map interpreter modifies the register map composition without having to reprogram or recompile the firmware.

13. The system of claim 12, wherein the configuration parameters define one or more of a number of bit fields, a description of a type, a description of a size, and a format of a discrete data object of each field of the register map.

14. The system of claim 12, wherein the configuration parameters define a mapping of each object to a destination data object known to the firmware.

15. The system of claim 12, wherein the at least one table comprises: a register map metadata descriptor table embodied in the random access memory and configured to interface with the register map interpreter in firmware stored in read-only memory of the embedded software system; and an internal data metadata descriptor table embodied in the random access memory and configured to interface with the register map interpreter and with an internal data interpreter embodied in firmware stored in read-only memory of the embedded software system.

16. The system of claim 12, wherein the at least one table of metadata descriptors enables execution of a custom random access firmware module in concert with the firmware stored in read-only memory of the embedded software system.

17. The system of claim 12, further comprising dynamically defining a memory architecture interface based on the at least one table of metadata descriptors.

18. The system of claim 17, further comprising dynamically defining distinct data elements within the memory architecture interface based on the at least one table of metadata descriptors.

19. The system of claim 12, wherein the configuration tool is an offline software tool that allows a system designer to specify a new register map layout and generate the corresponding metadata descriptor tables.

20. The system of claim 12, wherein the configuration parameters define a mapping of each object to a destination data object known to the firmware.

21. The system of claim 12, wherein the at least one table of metadata descriptors comprises: a register map metadata descriptor table embodied in the random access memory and configured to interface with the register map interpreter in firmware stored in read-only memory of the embedded software system; and an internal data metadata descriptor table embodied in the random access memory and configured to interface with the register map interpreter and with an internal data interpreter embodied in firmware stored in read-only memory of the embedded software system.

22. The system of claim 12, wherein the at least one table of metadata descriptors enables execution of a custom random access firmware module in concert with the firmware stored in read-only memory of the embedded software system.

23. A method of using a dynamically configured register map in an embedded software system, the method comprising:

dynamically defining a memory architecture interface based on at least one table of metadata descriptors associated with objects of the register map, wherein the at least one table of metadata descriptors is based on configuration parameters and embodied in random access memory of the embedded software system, wherein the metadata descriptors define composition and order of registers of the register map and configured to interface with a register map interpreter in firmware stored in read-only memory of the embedded software system; and the register map interpreter modifies the register map composition without having to reprogram or recompile the firmware.

24. The method of claim 23, further comprising dynamically defining distinct data elements within the memory architecture interface based on the at least one table of metadata descriptors.

25. The method of claim 23, wherein the configuration tool is an offline software tool that allows a system designer to specify a new register map layout and generate the corresponding metadata descriptor tables.

26. The method of claim 23, wherein the configuration parameters define a mapping of each object to a destination data object known to the firmware.

27. The method of claim 23, wherein the at least one table of metadata descriptors comprises: a register map metadata descriptor table embodied in the random access memory and configured to interface with the register map interpreter in firmware stored in read-only memory of the embedded software system; and an internal data metadata descriptor table embodied in the random access memory and configured to interface with the register map interpreter and with an internal data interpreter embodied in firmware stored in read-only memory of the embedded software system.

28. The method of claim 23, wherein the at least one table of metadata descriptors enables execution of a custom random access firmware module in concert with the firmware stored in read-only memory of the embedded software system.

* * * * *